(12) United States Patent
Duan et al.

(10) Patent No.: US 11,603,483 B2
(45) Date of Patent: Mar. 14, 2023

(54) ENVIRONMENT-FRIENDLY OXIDATION-RESISTING CARTON BINDER AND PREPARATION METHOD THEREFOR

(71) Applicant: Hongsheng Technology (Beijing) Co., Ltd, Beijing (CN)

(72) Inventors: Zhongda Duan, Beijing (CN); Jiafei Yan, Beijing (CN)

(73) Assignee: Hongsheng Technology (Beijing) Co., Ltd, Beijing (CN)

( * ) Notice: Subject to any disclaimer, the term of this patent is extended or adjusted under 35 U.S.C. 154(b) by 84 days.

(21) Appl. No.: 17/071,878

(22) Filed: Oct. 15, 2020

(65) Prior Publication Data

US 2021/0024787 A1    Jan. 28, 2021
US 2021/0261832 A9   Aug. 26, 2021

(30) Foreign Application Priority Data

Aug. 16, 2019 (CN) .......................... 201910759456.9

(51) Int. Cl.
*C09J 103/02* (2006.01)

(52) U.S. Cl.
CPC .................................. *C09J 103/02* (2013.01)

(58) Field of Classification Search
CPC .................................................... C09J 103/02
See application file for complete search history.

(56) References Cited

U.S. PATENT DOCUMENTS

| | | | | |
|---|---|---|---|---|
| 4,122,073 A | * | 10/1978 | Georgoudis | .......... C08L 101/00 524/270 |
| 2016/0280977 A1 | * | 9/2016 | Chen | .................. C08G 18/4202 |
| 2017/0029601 A1 | * | 2/2017 | McCaffrey | .............. B32B 27/08 |
| 2021/0024787 A1 | * | 1/2021 | Duan | ..................... C09J 103/02 |

FOREIGN PATENT DOCUMENTS

| | | |
|---|---|---|
| CN | 101962518 A | 2/2011 |
| CN | 105295809 A | 2/2016 |
| CN | 105400447 A | 3/2016 |
| CN | 107083208 A | 8/2017 |
| CN | 108690530 A | 10/2018 |
| JP | H0350281 A | 3/1991 |
| JP | 2005226011 A | 12/2010 |

* cited by examiner

*Primary Examiner* — Liam J Heincer

(57) ABSTRACT

The invention belongs to the technical field of binders, and particularly relates to an environment-friendly anti-oxidation carton adhesive and a preparation method thereof. The adhesive comprises the following components: dry starch, p-aminophenol epoxy resin, hydrogen peroxide, borax, sodium dicyandiamide, dimethyl carbonate, phthalic anhydride polyester polyol, polyethylene terephthalate, triethanolamine and antioxidant. The anti-oxidant is a compound of hindered phenol, phosphite ester, and a metal ion chelating agent. The adhesive not only has high bonding strength, but also has the effects of non-discoloring, mildewing and the like when used for a long time.

8 Claims, No Drawings

ENVIRONMENT-FRIENDLY OXIDATION-RESISTING CARTON BINDER AND PREPARATION METHOD THEREFOR

CROSS REFERENCE TO RELATED APPLICATION

This application claims priority of Chinese Application No. 2019107594569 filed on Aug. 16, 2019 and entitled "Environment-friendly Oxidation-resisting Carton Binder and Preparation Method therefor".

TECHNICAL FIELD

The present disclosure belongs to the technical field of adhesives, and particularly relates to an environment-friendly anti-oxidation carton adhesive and a preparation method therefor.

BACKGROUND

Silicate of soda is usually used as adhesives for the early-stage corrugated paper, and used for a carton factor in a long term due to the fact that the silicate of soda is fast in conjunctiva and low in price. However, the paper box adhered with silicate of soda is easy to absorb moisture and flood, the anti-calendering force and the degumming phenomenon of the box surface are destroyed, the packaged commodity is even corroded, and the environment is polluted. In the year of 1935, corn starch adhesive appeared in US by Stein Hall. The corn starch adhesive has the advantages of being high in bonding strength, light in weight, non-corrosive, good in moisture resistance, large in tappet force, good in toughness, simple and convenient to manufacture, low in cost and the like, and is more suitable for corrugated paper bonding. The corn starch adhesive is widely applied to the production of the corrugated paper box at the early stage of 1950s.

Production methods of the starch adhesive for corrugated paper may be divided into alkali paste method, dextrin method, main body carrier method and oxidation method. The binders/adhesives prepared by using the alkali paste method and the dextrin method have poor bonding force and corrosion resistance. The adhesives produced by the main body carrier method are only suitable for high-speed continuous machine production, the application range is limited. The adhesives produced by oxidation method are high in binding force, good in anti-corrosion and anti-enzyme effect and simple to manufacture. The oxidation method is the most used production method. A Patent application with number CN2010101192405 provides a preparation method of the starch adhesive comprising the following steps: performing cross-linking treatment on starch by adopting a cross-linking agent to obtain modified starch A; and sequentially treating the starch by sodium hypochlorite oxidation, succinic anhydride esterification and cationic etherifying agent to obtain modified starch B, and mixing starch A and B according to a certain proportion to obtain the modified starch adhesive. However, inventors of the present invention found that the existing starch adhesives might also have the problems of weak adhesive force, easy mildewing under long-time placement and the like.

SUMMARY OF THE INVENTION

The present invention provides an environment-friendly anti-oxidation carton adhesive, which can solve the problems of weak adhesive force, easy mildewing under long-time placement.

An environment-friendly anti-oxidation carton adhesive, comprising the following components in parts by weight: 100 parts of dry starch, 10-16 parts of p-aminophenol epoxy resin, 0.02-0.5 part of hydrogen peroxide, 0.05-0.1 part of borax, 5-8 parts of sodium dicyandiamide, 30-50 parts of dimethyl carbonate, 80-120 parts of phthalic anhydride polyester polyol, 60-80 parts of polyethylene terephthalate, 50-70 parts of triethanolamine and 1-3 parts of an antioxidant;

the antioxidant is a compound of hindered phenol, phosphite ester and a metal ion chelating agent.

An environment-friendly anti-oxidation carton binder, composed of the following formula in parts by weight: 100 parts of dry starch, 10-16 parts of p-aminophenol epoxy resin, 0.02-0.5 part of hydrogen peroxide, 0.05-0.1 part of borax, 5-8 parts of sodium dicyandiamide, 30-50 parts of dimethyl carbonate, 80-120 parts of phthalic anhydride polyester polyol, 60-80 parts of polyethylene terephthalate, 50-70 parts of triethanolamine, 1-3 parts of antioxidant; sodium hydroxide (a proper amount to adjust the pH value); and sodium thiosulfate (a proper amount to remove excess oxidant).

The antioxidant is a compound of hindered phenol (Hostanox O3), phosphite ester (Ultranox 626) and a metal ion chelating agent.

In some embodiments, The metal ion chelating agent is selected from the group of sodium tripolyphosphate and sodium pyrophosphate.

In some embodiments, the mass ratio among Hostanox O3, Ultranox 626 and the metal ion chelating agent is 1:(1-3):(0.1-0.5).

In some embodiments, the dry starch is corn starch, prepared to a 30-50% starch emulsion by weight with deionized water during use.

In some embodiments, the hydrogen peroxide is used as an oxidant and the concentration is less than 30%.

In some embodiments, the anti-oxidation carton adhesive is prepared by the following steps:

preparing dry starch with water to a 30-50% of starch emulsion, then adjust the pH value to 8-11 by sodium hydroxide;

adding hydrogen peroxide, being subjected to a reaction at room temperature for 20-40 min, then adding sodium hyposulfite in batches;

adding p-aminophenol epoxy resin and mixing at the temperature 50-60° C., being subjected to reaction for 20-40 min;

adding dimethyl carbonate to obtain a homogeneous system under high speed stirring, then adding phthalic anhydride polyester polyol, polyethylene terephthalate, and antioxidant in turn, raising temperature to 60-80° C., being subjected to reaction for 50-80 min and reducing to room temperature to obtain a viscous pre-polymer gel;

adding the viscous pre-polymer gel into a vacuum kneader, adding borax, sodium dicyandiamide and triethanolamine in turn, being subjected to kneading reaction for 30-60 min at room temperature to obtain the anti-oxidation carton adhesive.

The present disclosure also provides a preparation method of the environment-friendly anti-oxidation carton adhesive foresaid, comprising the following steps:

(1) preparing corn starch into a 30-50% starch emulsion with deionized water, then adding sodium hydroxide to adjust the pH value to 8-11, obtaining a milky starch paste;

(2) adding hydrogen peroxide into the starch paste prepared in step (1), and reacting for 20-40 min at the room temperature; after the reaction is finished, adding sodium thiosulfate spoon-by-spoon to perform reaction, and stopping the reaction to obtain a oxidized starch emulsion when the starch potassium iodide test paper does not change color;

(3) fully mixing the prepared oxidized starch emulsion in step (2) and p-aminophenol epoxy resin at 50-60° C., and reacting for 20-40 min to obtain a epoxy resin modified starch emulsion;

(4) adding dimethyl carbonate into the epoxy resin modified starch emulsion prepared in step (3); stirring at a high speed until a homogeneous system is formed; sequentially adding phthalic anhydride polyester polyol, polyethylene terephthalate and antioxidant, continuously stirring, raising the temperature to 60-80° C., keeping the temperature to perform an reaction for 50-80 min, and reducing the temperature to room temperature to obtain a viscous prepolymer gel;

(5) adding the prepolymer gel prepared in step (4) into a vacuum kneader, vacuumizing to remove bubbles, sequentially adding borax, sodium dicyandiamide and triethanolamine, continuing vacuumizing and nitrogen replacement, kneading for 30-60 min at room temperature, discharging to obtain an environment-friendly carton adhesive.

The prepared adhesive is better to kept isolated from air.

The invention has the following advantages: (1) The formula system adopts a compounded antioxidant, effectively improves the oxidation resistance of the colloid, and overcomes the problem of long-term use of discoloration. (2) The compound antioxidant also overcomes the problem that the adhesive is prone to mildewing in a humid environment. And (3) the adhesive prepared by the present method is stronger in bonding strength, faster in curing and longer in storage period.

DETAILED DESCRIPTION

The invention is further described below in conjunction with the embodiments, which are merely a part of the embodiments of the present invention. On the basis of the embodiments of the present invention, a person of ordinary skill in the art can make equivalent replacement or improvement without creative work, and are all within the protection scope of the present invention.

EXAMPLE 1

A environment-friendly anti-oxidation carton adhesive comprises the following components in parts by weight: 100 parts of dry starch, 13 parts of p-aminophenol epoxy resin, 0.2 part of 30% hydrogen peroxide, 0.08 part of borax, 6 parts of sodium dicyandiamide, 36 parts of dimethyl carbonate, 100 parts of phthalic anhydride polyester polyol, 70 parts of polyethylene terephthalate, 65 parts of triethanolamine, 2 parts of an antioxidant, a proper amount of sodium hydroxide (adjusting the pH value), and a proper amount of sodium thiosulfate (removing the excess oxidant).

Hydrogen peroxide is used as the oxidant.

The antioxidant is a compound of hindered phenol (Hostanox O3), phosphite ester (Ultrnox 626) and sodium tripolyphosphate, and mass ratio of Hostanox O3:Ultrnox 626: sodium tripolyphosphate=1:2:0.3.

The preparation method of the environment-friendly anti-oxidation carton adhesive specifically comprises the following steps:

(1) Preparing 100 g of corn dry starch into 40% of starch emulsion, then adding sodium hydroxide to adjust the pH value to 8-11, and obtaining a milky starch paste.

(2) Adding 30% hydrogen peroxide into the starch paste prepared in the step (1), and reacting for 30 min at the room temperature; after the reaction is finished, adding sodium thiosulfate into the spoons, and detecting the side reaction edge until the starch potassium iodide test paper does not change color so as to obtain the oxidized starch emulsion.

(3) Fully mixing the prepared oxidized starch emulsion with 13 g of p-aminophenol epoxy resin at 50° C., and reacting for 30 min to obtain the epoxy resin modified starch emulsion.

(4) Adding 36 g of dimethyl carbonate into the epoxy resin modified starch emulsion prepared in the step (3), stirring at a high speed until a homogeneous system is formed, sequentially adding 100 g of phthalic anhydride polyester polyol, 70 g of polyethylene terephthalate and 2 g of an antioxidant, continuously stirring and raising the temperature to 70° C., carrying out heat preservation reaction for 60 min, and cooling to room temperature after the reaction is completed to obtain a viscous prepolymer gel.

(5) Adding the prepolymer gel prepared in the step (4) into a vacuum kneader, vacuumizing to remove bubbles, sequentially adding 0.08 g of borax, 6 g of dicyandiamide and 65 g of triethanolamine, continuing vacuumizing nitrogen replacement, kneading at room temperature for 30-60 minutes, discharging to obtain an environment-friendly carton adhesive, and discharging the material to obtain an environment-friendly carton adhesive, wherein the discharging process and the packaging process being maintained an isolated air state.

EXAMPLE 2

The environment-friendly anti-oxidation carton adhesive comprises, by weight, 100 parts of dry starch, 15 parts of p-aminophenol epoxy resin, 0.5 part of 25% hydrogen peroxide, 0.1 part of borax, 6 parts of sodium dicyandiamide, 42 parts of dimethyl carbonate, 100 parts of phthalic anhydride polyester polyol, 70 parts of polyethylene terephthalate, 65 parts of triethanolamine, 2.5 parts of an antioxidant and a proper amount of sodium hydroxide (adjusting the pH value)), and a proper amount of sodium thiosulfate (the excess oxidant is reacted and removed).

Hydrogen peroxide is used as the oxidant.

The antioxidant is a compound of hindered phenol (Hostanox O3), phosphite (Ultrnox 626) and metal ion chelating agent sodium tripolyphosphate, and Hostanox O3:Ultranox 626:sodium tripolyphosphate=1:1:0.3.

The preparation method is the same as that in Example 1.

EXAMPLE 3

The environment-friendly anti-oxidation carton adhesive comprises, by weight, 100 parts of dry starch, 12 parts of p-aminophenol epoxy resin, 0.5 part of 30% hydrogen peroxide, 0.06 part of borax, 7 parts of sodium dicyandiamide, 35 parts of dimethyl carbonate, 110 parts of phthalic anhydride polyester polyol, 70 parts of polyethylene terephthalate, 55 parts of triethanolamine, 3 parts of an antioxidant, a proper amount of sodium hydroxide (adjusting the pH value), and a proper amount of sodium thiosulfate (removing the excess oxidant).

Hydrogen peroxide is used as the oxidant.

The antioxidant is a compound of hindered phenol (Hostanox O3), phosphite (Ultranox 626) and metal ion chelating agent sodium pyrophosphate, and Hostanox O3):Ultranox 626):sodium pyrophosphate=1:2:0.2.

The preparation method is the same as that in Example 1.

EXAMPLE 4

The environment-friendly anti-oxidation carton adhesive comprises, by weight, 100 parts of dry starch, 16 parts of p-aminophenol epoxy resin, 0.5 part of 30% hydrogen peroxide, 0.05 part of borax, 5 parts of sodium dicyandiamide, 40 parts of dimethyl carbonate, 90 parts of phthalic anhydride polyester polyol, 80 parts of polyethylene terephthalate, 65 parts of triethanolamine, 3 parts of an antioxidant, a proper amount of sodium hydroxide (adjusting the pH value), a proper amount of sodium thiosulfate (removing the excess oxidant).

Hydrogen peroxide is used as the oxidant.

The antioxidant is a compound of hindered phenol (Hostanox O3), phosphite (Ultrnox 626) and metal ion chelating agent sodium pyrophosphate, and Hostanox O3:Ultranox 626:sodium pyrophosphate=1:3:0.3.

The preparation method is the same as that in Example 1.

Those skilled in the art will readily observe that numerous modifications and alterations of the device and method may be made while retaining the teachings of the invention.

What is claimed is:

1. An environment-friendly anti-oxidation carton adhesive, composed of the following compoments in parts by weight: 100 parts of dry starch, 10-16 parts of p-aminophenol epoxy resin, 0.02-0.5 part of hydrogen peroxide, 0.05-0.1 part of borax, 5-8 parts of sodium dicyandiamide, 30-50 parts of dimethyl carbonate, 80-120 parts of phthalic anhydride polyester polyol, 60-80 parts of polyethylene terephthalate, 50-70 parts of triethanolamine and 1-3 parts of an antioxidant;
the antioxidant is a compound of hindered phenol antioxidants, phosphite ester antioxidants and a metal ion chelating agent.

2. The environment-friendly anti-oxidation carton adhesive according to claim 1, wherein, the mass ratio among the hindered phenol antioxidants, the phosphite ester antioxidants and the metal ion chelating agent is 1:(1-3):(0.1-0.5).

3. The environment-friendly anti-oxidation carton adhesive according to claim 1, wherein, the metal ion chelating agent is selected from the group of sodium tripolyphosphate and sodium pyrophosphate.

4. The environment-friendly anti-oxidation carton adhesive according to claim 3, wherein, the mass ratio among the hindered phenol antioxidants, the phosphite ester antioxidants and the metal ion chelating agent is 1:(1-3):(0.1-0.5).

5. The environment-friendly anti-oxidation carton adhesive according to claim 1, wherein, the dry starch is corn starch, prepared to a 30-50% starch emulsion by weight with deionized water during use.

6. The environment-friendly anti-oxidation carton adhesive according to claim 1, wherein the hydrogen peroxide is used as an oxidant and the concentration is less than 30%.

7. A method of preparing an environment-friendly anti-oxidation carton adhesive, comprising the following steps:
preparing reactants in parts by weight: 100 parts of dry starch, 10-16 parts of p-aminophenol epoxy resin, 0.02-0.5 parts of hydrogen peroxide, 0.05-0.1 parts of borax, 5-8 parts of sodium dicyandiamide, 30-50 parts of dimethyl carbonate, 80-120 parts of phthalic anhydride polyester polyol, 60-80 parts of polyethylene terephthalate, 50-70 parts of triethanolamine and 1-3 parts of an antioxidant;
the antioxidant is a compound of hindered phenol antioxidants, phosphite ester antioxidants and a metal ion chelating agent in a mass ratio of 1:(1-3):(0.1-0.5);then,
preparing 100 parts of dry starch with water to a 30-50% of starch emulsion, then adjust the pH value to 8-11 by sodium hydroxide;
adding 0.02-0.5 part of hydrogen peroxide, being subjected to a reaction at room temperature for 20-40 min, then adding sodium hyposulfite in batches;
adding 10-16 parts of p-aminophenol epoxy resin and mixing at the temperature 50-60° C., being subjected to reaction for 20-40 min;
adding 30-50 parts of dimethyl carbonate to obtain a homogeneous system under high speed stirring, then adding 80-120 parts of phthalic anhydride polyester polyol, 60-80 parts of polyethylene terephthalate, and 1-3 parts of antioxidant in turn, raising temperature to 60-80° C., being subjected to reaction for 50-80 min and reducing to room temperature to obtain a viscous pre-polymer gel;
adding the viscous pre-polymer gel into a vacuum kneader, adding 0.05-0.1 parts of borax, 5-8 parts of sodium dicyandiamide and 50-70 parts of triethanolamine in turn, being subjected to kneading reaction for 30-60 min at room temperature to obtain the anti-oxidation carton adhesive.

8. A method of preparing an environment-friendly anti-oxidation carton adhesive, comprising the following steps:
preparing reactants in parts by weight: 100 parts of dry starch, 10-16 parts of p-aminophenol epoxy resin, 0.02-0.5 part of hydrogen peroxide, 0.05-0.1 part of borax, 5-8 parts of sodium dicyandiamide, 30-50 parts of dimethyl carbonate, 80-120 parts of phthalic anhydride polyester polyol, 60-80 parts of polyethylene terephthalate, 50-70 parts of triethanolamine and 1-3 parts of an antioxidant; then,
(1) preparing 100 parts of corn starch into a 30-50% starch emulsion with deionized water, then adding sodium hydroxide to adjust the pH value to 8-11, obtaining a milky starch paste;
(2) adding 0.02-0.5 part of hydrogen peroxide into the starch paste prepared in step (1), and reacting for 20-40 min at the room temperature; after the reaction is finished, adding sodium thiosulfate spoon-by-spoon to perform reaction, and stopping the reaction to obtain a oxidized starch emulsion when the starch potassium iodide test paper does not change color;
(3) fully mixing the prepared oxidized starch emulsion in step (2) and 10-16 parts of p-aminophenol epoxy resin at 50-60° C., and reacting for 20-40 min to obtain a epoxy resin modified starch emulsion;
(4) adding 30-50 parts of dimethyl carbonate into the epoxy resin modified starch emulsion prepared in step (3); stirring at a high speed until a homogeneous system is formed; sequentially adding 80-120 parts of phthalic anhydride polyester polyol, 60-80 parts of polyethylene terephthalate and 1-3 parts of antioxidant, continuously stirring, raising the temperature to 60-80° C., keeping the temperature to perform an reaction for 50-80 min, and reducing the temperature to room temperature to obtain a viscous prepolymer gel;
(5) adding the prepolymer gel prepared in step (4) into a vacuum kneader, vacuumizing to remove bubbles, sequentially adding 0.05-0.1 parts of borax, 5-8 parts of sodium dicyandiamide and 50-70 parts of triethanolamine, continuing vacuumizing and nitrogen replacement, kneading for 30-60 min at room temperature, discharging to obtain an environment-friendly carton adhesive.

* * * * *